United States Patent
Katano et al.

(10) Patent No.: US 9,199,550 B2
(45) Date of Patent: Dec. 1, 2015

(54) FUEL CELL VEHICLE

(75) Inventors: Koji Katano, Toyota (JP); Hiroyuki Sekine, Toyota (JP); Ikuhiro Nakamura, Tokai (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 258 days.

(21) Appl. No.: 13/983,622

(22) PCT Filed: Dec. 5, 2011

(86) PCT No.: PCT/JP2011/078077
§ 371 (c)(1),
(2), (4) Date: Aug. 5, 2013

(87) PCT Pub. No.: WO2013/084278
PCT Pub. Date: Jun. 13, 2013

(65) Prior Publication Data
US 2013/0306387 A1   Nov. 21, 2013

(51) Int. Cl.
*B60L 11/18* (2006.01)
*H01M 8/24* (2006.01)
*B60L 1/02* (2006.01)
*B60L 3/00* (2006.01)
*H02M 3/158* (2006.01)
*B60K 15/063* (2006.01)

(52) U.S. Cl.
CPC .............. *B60L 11/1896* (2013.01); *B60L 1/02* (2013.01); *B60L 3/003* (2013.01); *B60L 11/1803* (2013.01); *B60L 11/1892* (2013.01); *B60L 11/1898* (2013.01); *H01M 8/2475* (2013.01); *B60K 2015/0638* (2013.01); *B60L 2210/14* (2013.01); *B60L 2240/36* (2013.01); *B60L 2240/525* (2013.01); *H01M 2250/20* (2013.01); *H02M 3/1584* (2013.01); *Y02E 60/50* (2013.01); *Y02T 10/7225* (2013.01); *Y02T 90/32* (2013.01); *Y02T 90/34* (2013.01)

(58) Field of Classification Search
CPC ....... B60K 6/32; B60L 1/1896; B60L 1/1898; B60L 2210/10; B60L 2210/14
See application file for complete search history.

(56) References Cited

U.S. PATENT DOCUMENTS

| | | | |
|---|---|---|---|
| 7,690,686 B2* | 4/2010 | Hashimura et al. | 280/782 |
| 7,703,564 B2* | 4/2010 | Kondo | 180/65.31 |
| 7,715,217 B2* | 5/2010 | Manabe et al. | 363/95 |
| 7,896,115 B2* | 3/2011 | Ono et al. | 180/65.31 |
| 8,143,835 B2* | 3/2012 | Taguchi et al. | 318/599 |
| 8,154,152 B2* | 4/2012 | Kojima et al. | 307/45 |
| 8,159,823 B2* | 4/2012 | Murakami | 361/716 |
| 8,159,850 B2* | 4/2012 | Manabe et al. | 363/149 |

(Continued)

FOREIGN PATENT DOCUMENTS

| | | |
|---|---|---|
| JP | 2007-015612 A | 1/2007 |
| JP | 2010-252462 A | 11/2010 |

(Continued)

*Primary Examiner* — Katy M Ebner
(74) *Attorney, Agent, or Firm* — Kenyon & Kenyon LLP

(57) ABSTRACT

This fuel cell vehicle comprises a DC-DC converter constituted of a power input portion, reactors, and switching circuit sections. Connecting portions of the power input portion to the reactors and connecting portions of the reactors to the switching circuit sections in the DC-DC converter are all arranged side by side along a forward-backward direction of the vehicle, and arranged in this state on the side of one side surface of the DC-DC converter on one of the right side and left side of the vehicle.

10 Claims, 10 Drawing Sheets

(56) References Cited

U.S. PATENT DOCUMENTS

| | | | |
|---|---|---|---|
| 8,206,864 B2* | 6/2012 | Baird et al. | 429/433 |
| 8,527,126 B2* | 9/2013 | Yamamoto et al. | 701/22 |
| 8,607,909 B2* | 12/2013 | Ohashi | 180/68.5 |
| 8,673,467 B2* | 3/2014 | Katano et al. | 429/7 |
| 8,932,769 B2* | 1/2015 | Ohashi | 429/400 |
| 2003/0211377 A1* | 11/2003 | Holmes et al. | 429/34 |
| 2008/0277175 A1* | 11/2008 | Tyler et al. | 180/65.3 |
| 2009/0133943 A1* | 5/2009 | Noguchi et al. | 180/65.21 |
| 2010/0098979 A1* | 4/2010 | Imamura | 429/24 |
| 2011/0233996 A1* | 9/2011 | Kato et al. | 307/9.1 |
| 2012/0013182 A1* | 1/2012 | Minegishi et al. | 307/9.1 |
| 2012/0013185 A1* | 1/2012 | Ohashi | 307/10.1 |
| 2012/0015257 A1* | 1/2012 | Arisawa et al. | 429/400 |
| 2012/0021301 A1* | 1/2012 | Ohashi | 429/400 |
| 2012/0176749 A1* | 7/2012 | Arisawa et al. | 361/728 |
| 2013/0056291 A1* | 3/2013 | Hotta | 180/65.31 |
| 2014/0028256 A1* | 1/2014 | Sugiyama | 320/109 |
| 2014/0145697 A1* | 5/2014 | Manabe, Kota | 323/283 |

FOREIGN PATENT DOCUMENTS

| | | |
|---|---|---|
| JP | 2011-018553 A | 1/2011 |
| WO | 2010140226 A | 6/2009 |
| WO | 2010-122648 A1 | 10/2010 |
| WO | 2010/137147 A1 | 12/2010 |

* cited by examiner

FUEL CELL VEHICLE

This is a 371 national phase application of PCT/JP2011/078077 filed 5 Dec. 2011, the contents of which are incorporated herein by reference.

TECHNICAL FIELD

The present invention relates to a fuel cell vehicle.

BACKGROUND ART

In recent years, the development of a fuel cell vehicle which runs by means of a power supplied from a fuel cell system has proceeded as a countermeasure against future petroleum depletion or global warming. It is necessary to mount, on such a fuel cell vehicle, a fuel cell stack which is a constituent device of the fuel cell system, a boost converter, various auxiliary machines typified by a cooling system, and the like.

In the following patent document 1, there is disclosed a fuel cell vehicle on which a fuel cell stack, a boost converter (a DC-DC converter) and the like are mounted, under a floor panel of the vehicle. However, when the fuel cell stack and the like are mounted under the floor panel, there is a restriction that a broad space cannot be acquired under the floor panel, owing to a restriction on a vehicle height, a necessity of acquiring a seating space for passengers, and the like. This requires a contrivance for arranging the fuel cell stack and the like in a limited space.

To this end, in a fuel cell vehicle disclosed in the following patent document 2, a fuel cell stack is disposed in a center tunnel (a center console) formed between a driver seat and a front passenger seat. In this way, a space in the center tunnel is effectively utilized, whereby the seating space for the passengers is acquired while preventing the rise of a height of the whole floor panel.

PRIOR ART DOCUMENTS

Patent Documents

[Patent Document 1] Japanese Patent Application Laid-Open No. 2011-18553
[Patent Document 2] Japanese Patent Application Laid-Open No. 2007-15612

SUMMARY OF THE INVENTION

Problems to be Solved by the Invention

When a fuel cell stack is disposed in a center tunnel, a boost converter can be disposed adjacent to the fuel cell stack also in the center tunnel, which is preferable as seen from an advantage that a wiring installation length can be shortened, in addition to an advantage that a space under a floor panel can further effectively be utilized.

In this case, the interior of the center tunnel is an elongated space extending in a forward-backward direction of a vehicle. Therefore, the fuel cell stack and the boost converter are arranged along the forward-backward direction of the vehicle. Moreover, both of the fuel cell stack and the boost converter are requested to be designed so that dimensions in a right-left direction of the vehicle are decreased as much as possible.

However, the boost converter has therein large-sized constitutional elements such as reactors and switching elements. Furthermore, it is also necessary to arrange bus bars which electrically connect the reactors to the switching elements, and a cooling piping through which a refrigerant circulates to cool the switching elements, and hence it is not easy to decrease the dimension of the boost converter in the right-left direction of the vehicle.

In the above patent document 2, it is disclosed that the fuel cell stack is disposed in the center tunnel, but the disposing of the boost converter in the center tunnel as well is not investigated. The specific arrangement of the bus bars constituting the boost converter, the arrangement of the cooling piping and the like are not disclosed.

The present invention has been developed in view of such problems, and an object thereof is to provide a fuel cell vehicle on which a fuel cell stack and a boost converter are mounted in a center tunnel, whereby it is possible to prevent the rise of a height of the whole floor panel, and to acquire a seating space for passengers.

Means for Solving the Problems

To achieve the above object, a fuel cell vehicle according to the present invention is a fuel cell vehicle having a floor panel provided with a center tunnel extending in a forward-backward direction of the vehicle, fuel cells which are direct-current power sources and a boost converter which raises output voltages of the fuel cells to output a power being disposed in the center tunnel along the forward-backward direction of the vehicle, characterized in that the boost converter comprises a power input portion to input the power supplied by the fuel cells; reactors each having one end connected to the power input portion; switching circuit sections each connected to the other end of each of the reactors; and a power output portion connected to the switching circuit sections to output the power, and connecting portions of the power input portion to the reactors and connecting portions of the reactors to the switching circuit sections are all arranged side by side along the forward-backward direction of the vehicle, and arranged in this state on the side of one side surface of the boost converter on one of the right side and the left side of the vehicle.

The reactors mounted on the boost converter are large-sized coils, and hence the connecting portions of the reactors to the power input portion and the connecting portions of the reactors to the switching circuit sections are all formed by connecting bus bars each formed in a predetermined dimension to one another. Therefore, the arrangement of these connecting portions also becomes a problem in a small space such as the center tunnel.

For example, on the side surface of the boost converter on the front side of the vehicle, a cooling piping extending toward a radiator disposed in the foremost part of the vehicle is present. Therefore, it is difficult to acquire a space for arranging the connecting portions. On the other hand, bus bars and the like for connecting the boost converter to the fuel cell stack are arranged on the side surface of the converter on the rear side of the vehicle, and hence it is also difficult to acquire the space for arranging the connecting portions. Furthermore, when the time of vehicle collision is taken into consideration, it is demanded from the viewpoint of safety design that the boost converter is to be disposed on the side of the vehicle which is as rear as possible. Therefore, it is not preferable to arrange the connecting portions on the side surface of the boost converter on the rear side of the vehicle.

According to the present invention, the connecting portions of the power input portion to the reactors and the connecting portions of the reactors to the switching circuit sections are all arranged side by side along the forward-backward direction of the vehicle, and are arranged in this state on the side surface of the boost converter on one of the right side and the left side of the vehicle.

According to such a constitution, it is possible to arrange the connecting portions of the power input portion to the reactors and the connecting portions of the reactors to the switching circuit sections, while avoiding the vehicle front side on which the cooling piping is present, or the vehicle rear side on which the bus bars and the like for connecting the boost converter to the fuel cell stack are arranged.

Moreover, all these connecting portions are arranged side by side along the forward-backward direction of the vehicle. Therefore, even in a multiphase converter provided with the plurality of reactors, a width of the boost converter in the right-left direction of the vehicle does not increase, depending on the number of the reactors. Furthermore, all these connecting portions are arranged on the one side surface of the boost converter on one of the right side and the left side of the vehicle. Consequently, unlike a case where the connecting portions are arranged on both the side surfaces, the width of the boost converter in the right-left direction of the vehicle is decreased. In consequence, it is possible to dispose the boost converter in the center tunnel.

Moreover, in the fuel cell vehicle according to the present invention, the reactor is provided below the switching circuit section in an upward-downward direction of the vehicle. The reactor has a first reactor bus bar electrically connected to the power input portion, and a second reactor bus bar electrically connected to the switching circuit section. An input bus bar extending from the power input portion is interposed between the switching circuit section and the reactor in the upward-downward direction of the vehicle. Also preferably, a position of a connecting portion between the input bus bar and the first reactor bus bar is provided at a higher position than a position of a connecting portion between the switching circuit section and the second reactor bus bar.

In this preferable mode, the input bus bar extending from the power input portion is interposed between the switching circuit section and the reactor in the upward-downward direction of the vehicle, and the position of the connecting portion between the input bus bar and the first reactor bus bar is provided at the higher position than the position of the connecting portion between the switching circuit section and the second reactor bus bar.

According to such a constitution, the switching circuit section disposed above the reactor can be disposed at a low position. Therefore, the height of the boost converter is lowered, and it becomes easier to dispose the boost converter in the center tunnel.

Moreover, in the fuel cell vehicle according to the present invention, current measuring means for measuring a current flowing through the reactor is also preferably provided on a current path on a side opposite to a current path connected to the switching circuit section in a current path connected to the reactor.

In the boost converter, such current measuring means for measuring the current is disposed for the purpose of controlling the current flowing through the reactor so that the current becomes a predetermined size. However, an electric noise is generated by an operation of a switching circuit connected to the reactor, and the current cannot exactly be measured by the current measuring means sometimes.

In this preferable mode, the current measuring means is provided on the current path on the side opposite to the current path connected to the switching circuit section in the current path connected to the reactor. That is, the reactor is disposed halfway in the current path extending from the current measuring means to the switching circuit section. In consequence, the electric noise generated by the operation of the switching circuit section reaches the current measuring means through the reactor. When the electric noise passes through the reactor, the noise is decreased. Therefore, the current can more exactly be measured by the current measuring means.

Moreover, the fuel cell vehicle according to the present invention further comprises a capacitor which is interposed between the switching circuit section and the power output portion, to level the output voltage of the boost converter; a refrigerant flow path which is disposed adjacent to the switching circuit section, and through which a refrigerant to cool the switching circuit section circulates; a first piping through the refrigerant is supplied to the refrigerant flow path, and which is disposed so as to extend from the boost converter toward the front side of the vehicle; and a second piping through which the refrigerant is discharged from the refrigerant flow path, and which is disposed away from the first piping so as to extend from the boost converter toward the front side of the vehicle. The capacitor is also preferably interposed between the first piping and the second piping, in the vicinity of the switching circuit section.

The capacitor disposed to level the output voltage of the boost converter has a large outer shape because a required capacity is large, and an installation place thereof becomes a problem. Moreover, the capacitor generates heat during the operation of the boost converter. However, when the boost converter is disposed in a small space such as the center tunnel, it is difficult to sufficiently acquire a path through which the internally generated heat is released. A temperature of the capacitor excessively rises. However, owing to a spatial restriction, it is difficult to separately provide the cooling piping which cools the capacitor.

To solve these problems, the present inventors have noted that two pipings through which the refrigerant to cool the switching circuit section circulates are arranged away from each other in accordance with a width of the switching circuit section in the right-left direction of the vehicle. Furthermore, it has been noted that these pipings require a predetermined length so that the switching circuit section is not damaged by a force applied to the pipings, when these pipings are connected to the radiator. That is, a space is formed with a predetermined width (in the right-left direction of the vehicle) and a predetermined length (in the forward-backward direction of the vehicle) between the first piping and the second piping.

In this preferable mode, the capacitor is interposed between the first piping and the second piping arranged away from each other so as to extend from the boost converter toward the front side of the vehicle. That is, since the capacitor is disposed in the above space, a volume occupied by the boost converter in the center tunnel does not increase, when the capacitor is installed. Moreover, the capacitor is installed at the position sandwiched between the first piping and the second piping in which the temperature lowers owing to the refrigerant circulating through the pipings. Therefore, air temperature lowers through these pipings around the capacitor, and the temperature of the capacitor is prevented from excessively rising. Furthermore, since the capacitor is installed in the vicinity of the switching circuit section, the current path between the capacitor and the switching circuit section becomes short, and a loss of the power is decreased. Moreover, an inductance is lowered, whereby a surge voltage of the switching circuit section can be lowered.

Moreover, in the fuel cell vehicle according to the present invention, the capacitor is fixed to a capacitor cover disposed so as to cover at least a portion of an outer periphery of the capacitor, and the capacitor cover also preferably comes in contact with at least one of the first piping and the second piping.

In this preferable mode, the capacitor is fixed to the capacitor cover disposed so as to cover at least a portion of the outer periphery of the capacitor, and the capacitor cover comes in contact with at least one of the first piping and the second piping. According to such a constitution, at least one of the first piping and the second piping in which the temperature lowers owing to the refrigerant circulating therethrough directly cools the capacitor cover which comes in contact with this piping. In consequence, the capacitor covered with the capacitor cover can efficiently be cooled.

Moreover, in the fuel cell vehicle according to the present invention, the capacitor cover has an upper wall portion which covers the upper surface of the capacitor, and in the upper wall portion, a vent hole extending through the upper wall portion is also preferably formed.

In this preferable mode, since the capacitor cover has the upper wall portion which covers the upper surface of the capacitor, the capacitor can be fixed while the upper part of the capacitor is protected. Moreover, in the upper wall portion of the capacitor cover, the vent hole extending through this portion is formed. Therefore, a path through which the heat generated in the capacitor is released to the outside of the capacitor cover is acquired, and it is possible to more efficiently cool the capacitor.

Moreover, in the fuel cell vehicle according to the present invention, the capacitor cover is also preferably provided with a radiating fin formed in the upper wall portion.

In this preferable mode, since the capacitor cover is provided with the radiating fin, heat radiation from the capacitor cover to the ambient air is promoted. It is possible to more efficiently cool the capacitor.

Moreover, the fuel cell vehicle according to the present invention further comprises a radiator to cool the refrigerant on the vehicle front side from the boost converter, a first radiator piping extending from the radiator and connected to the first piping, and a second radiator piping extending from the radiator and connected to the second piping. Vertically under a first connecting portion connecting the first piping to the first radiator piping and a second connecting portion connecting the second piping to the second radiator piping, liquid receiving trays are also preferably provided so as to receive the refrigerant, when the refrigerant flows out through the first connecting portion and the second connecting portion.

In the fuel cell vehicle on which the boost converter is mounted in the center tunnel, a cooling piping linking the radiator disposed on the front side of the vehicle to the boost converter is disposed horizontally along the forward-backward direction of the vehicle. At the time of repair or maintenance of the fuel cell vehicle, it is necessary to remove both of the first radiator piping extending from the boost converter and connected to the first piping, and the second radiator piping extending from the boost converter and connected to the second piping. However, the first piping and the second piping are horizontally arranged as described above. Therefore, when the first radiator piping and the second radiator piping are removed, the refrigerant remaining in the pipings flows out through the first connecting portion and the second connecting portion, and drops down sometimes.

On the vehicle front side of the boost converter, a current path to output the power to a motor is disposed. Therefore, when the refrigerant flows out and drops down through the first connecting portion and the second connecting portion, there occurs a disadvantage that bus bars and the like constituting such a current path are contaminated with the refrigerant.

In this preferable mode, vertically under the first connecting portion connecting the first piping extending from the boost converter to the first radiator piping extending from the radiator and the second connecting portion connecting the second piping extending from the boost converter to the second radiator piping extending from the radiator, the liquid receiving trays are provided. According to such a constitution, even when the refrigerant flows out through the first connecting portion and the second connecting portion, the liquid receiving trays receive the refrigerant. Therefore, it is possible to securely prevent the disadvantage that the current path present under the connecting portions is contaminated, and it is possible to save a lot of work at the time of service.

Moreover, in the fuel cell vehicle according to the present invention, the power output portion is connected to relays to switch the supply and shutoff of the power for the load, and the liquid receiving trays are also preferably formed in upper portions of the relays.

In this preferable mode, the liquid receiving trays are formed in the upper portions of the relays connected to the power output portion in the current path formed on the vehicle front side of the boost converter. Since the liquid receiving trays are formed in the upper portions of the relays which are conventional components, it is possible to prevent the disadvantage when the refrigerant flows out, while suppressing the increase of the volume of the boost converter caused by adding the liquid receiving trays.

Moreover, in the fuel cell vehicle according to the present invention, the boost converter, which is stored in a storage case, is disposed in the center tunnel. In the storage case, a first through hole through which the first piping or the first radiator piping extends and a second through hole through which the second piping or the second radiator piping extends are formed. Furthermore, a third through hole through which an electric wiring connected to the boost converter is drawn to the outside is also preferably formed at a position between the first through hole and the second through hole, in the right-left direction of the vehicle.

In this preferable mode, the storage case to store the boost converter is provided with two holes through which the pipings to circulate the refrigerant extend, that is, the first through hole and the second through hole. Furthermore, the third through hole through which the electric wiring connected to the boost converter is drawn to the outside is formed at the position between the first through hole and the second through hole, in the right-left direction of the vehicle.

According to such a constitution, it is possible to effectively utilize a portion between the first through hole and the second through hole arranged away from each other in accordance with a width of the switching circuit section. The width of the storage case in the right-left direction of the vehicle is not enlarged, but it is possible to form the third through hole through which the electric wiring is drawn to the outside. In consequence, the volume increase of the boost converter is suppressed, and it becomes easier to dispose the boost converter in the center tunnel.

Advantageous Effect of the Invention

According to the present invention, there is provided a fuel cell vehicle on which a fuel cell stack and a boost converter are mounted in a center tunnel, whereby it is possible to prevent the rise of a height of the floor panel and to acquire passengers' seating spaces.

MODE FOR CARRYING OUT THE INVENTION

Hereinafter, an embodiment of the present invention will be described with reference to the accompanying drawings. To facilitate the understanding of the description, the same constituent elements in the respective drawings are denoted with the same reference signs as much as possible, thereby omitting redundant description.

Figure 1:
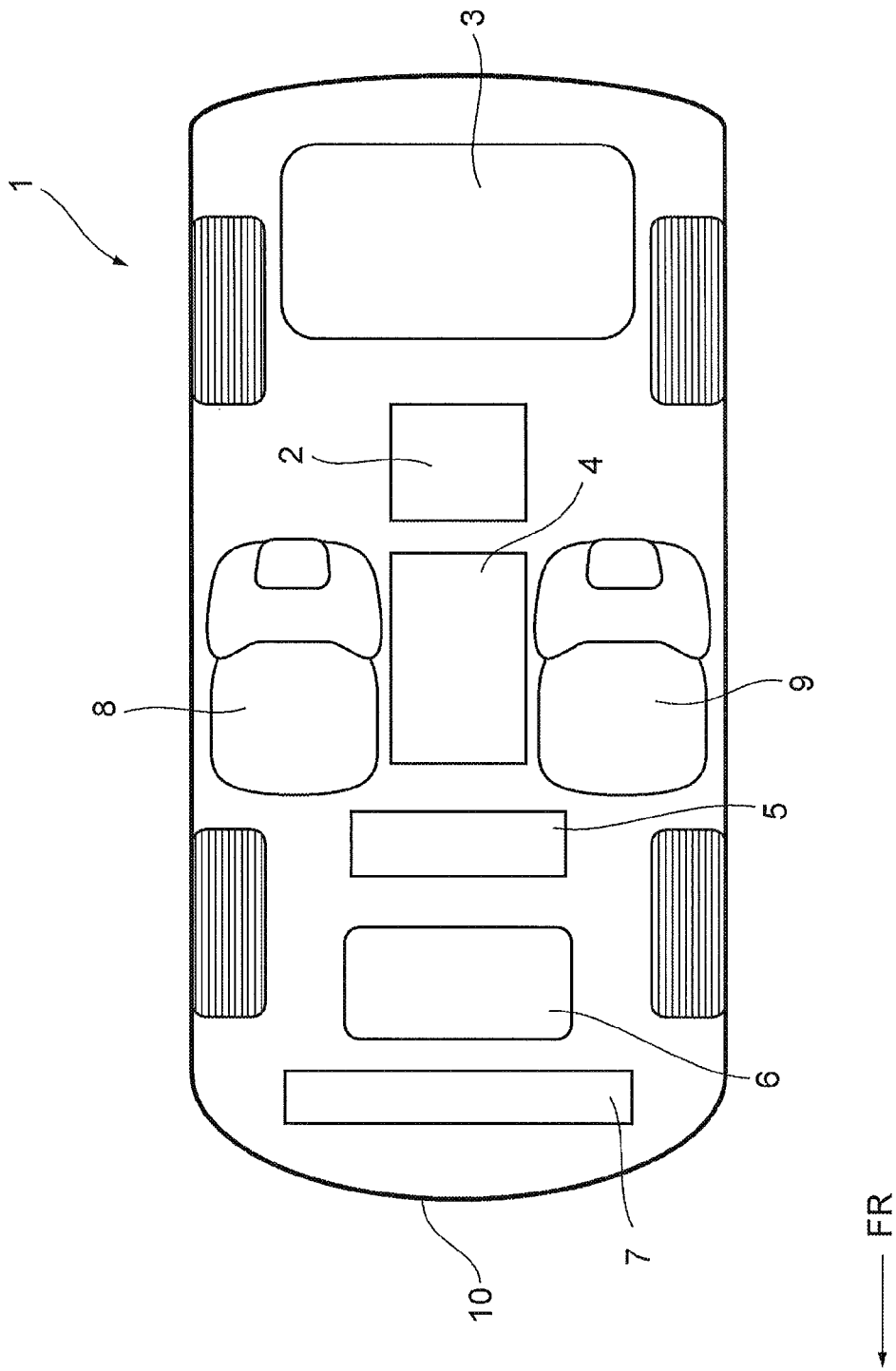
FIG. 1 is a top plan view schematically showing a constitution of a fuel cell vehicle which is an embodiment of the present invention.

First, a constitution of a fuel cell vehicle which is the embodiment of the present invention will be described with reference to FIG. 1. FIG. 1 is a top plan view schematically showing the constitution of the fuel cell vehicle which is the embodiment of the present invention. As shown in FIG. 1, a fuel cell vehicle 1 is constituted of a fuel cell device 2, a fuel tank 3, a DC-DC converter 4, an inverter 5, a motor 6, and a radiator 7.

The fuel cell device 2 is a device which generates a power to run the fuel cell vehicle 1, and is disposed in a center tunnel formed between a driver seat 8 and a front passenger seat 9, under a floor panel of the fuel cell vehicle 1.

The fuel cell device 2 is, for example, a polymer electrolyte type fuel cell device, and has a stack structure in which a large number of unit cells are stacked. Each unit cell has a structure including an air pole on one surface of an electrolyte film constituted of an ion exchange film, including a fuel pole on the other surface thereof, and further including a pair of separators so as to sandwich the air pole and the fuel pole from both sides. In this case, a hydrogen gas is supplied to a hydrogen gas passage of one separator, and an oxidizing gas is supplied to an oxidizing gas passage of the other separator, whereby these reactant gases perform a chemical reaction to generate the power.

The fuel tank 3 is a tank to store the hydrogen gas which is supplied to the fuel cell device 2, and is disposed in a rear part of the fuel cell vehicle 1. A flow rate of the hydrogen gas to be supplied from the fuel tank 3 to the fuel cell device 2 is controlled by a not-shown controller, flow rate regulator or the like, in accordance with a required power determined by an accelerator pedal open degree or the like.

The DC-DC converter 4 is a direct-current voltage converter, and has a function of raising a direct-current voltage of the power input from the fuel cell device 2 to output (supply) the power to the inverter 5. In the present embodiment, similarly to the fuel cell device 2, the DC-DC converter 4 is disposed in the center tunnel formed between the driver seat 8 and the front passenger seat 9, under the floor panel of the fuel cell vehicle 1. The DC-DC converter 4, which is stored in a storage case 11 (not shown in FIG. 1) formed by aluminum die casting, is disposed on a vehicle front side from the fuel cell device 2. A detailed structure of the DC-DC converter 4 will be described later in more detail.

The inverter 5 has a function of converting the direct-current power output from the DC-DC converter 4 to a three-phase alternating-current power, to supply the power to the motor 6. The inverter 5 has a specification for receiving an input voltage of 650 V which is larger than the output voltage of the fuel cell device 2, to operate. The DC-DC converter 4 is interposed between the fuel cell device 2 and the inverter 5, to perform a role of making up a difference between the output voltage of the fuel cell device 2 and the input voltage by which the inverter 5 is operable.

The motor 6 is an electromagnetic motor which receives the supply of the three-phase alternating-current power output from the inverter 5, and generates a driving force to run the fuel cell vehicle 1. The driving power generated by the motor 6 is regulated, when the not-shown controller calculates the required power on the basis of the accelerator pedal open degree or the like, and controls the output power of the fuel cell device 2 and the output power of the inverter 5 on the basis of such a required power.

The radiator 7 is a device to cool the fuel cell device 2, the DC-DC converter 4, the motor 6 and the like constituting the fuel cell vehicle 1. The radiator 7 allows a refrigerant to circulate through a piping which is not shown in FIG. 1, between the respective devices which are cooling objects. Outside air introduced through a vent port 10 provided in a bumper face part of the fuel cell vehicle 1 takes heat from the refrigerant passing through the radiator 7, to cool the respective devices. Therefore, the radiator 7 is disposed in the foremost part of the vehicle.

Figure 2:
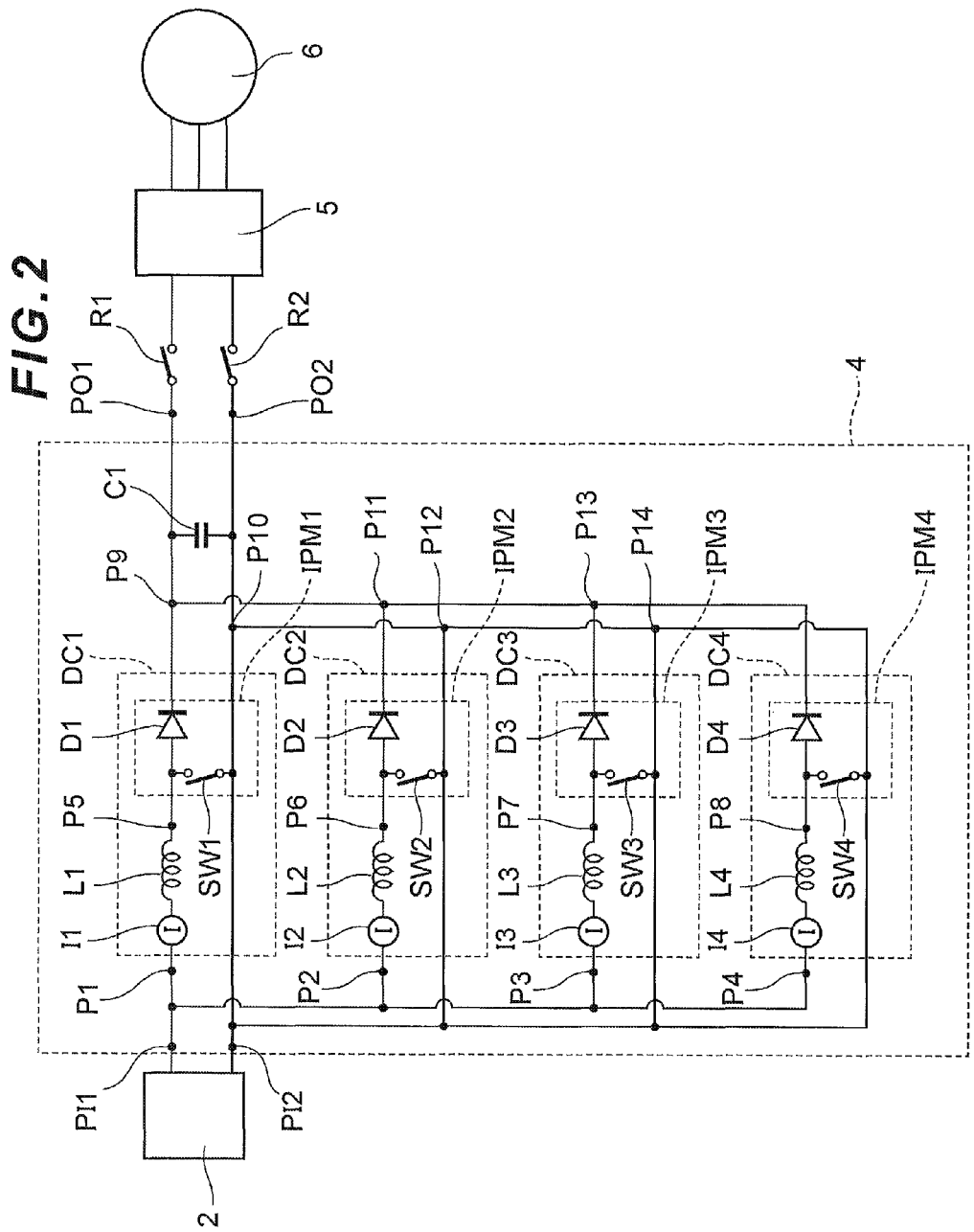
FIG. 2 is a view showing an electric constitution of the fuel cell vehicle shown in FIG. 1.

Subsequently, an electric constitution of the DC-DC converter 4 will be described with reference to FIG. 2. FIG. 2 is a view showing the electric constitution of the fuel cell vehicle 1, and especially showing, in detail, the constitution in the DC-DC converter 4. As shown in FIG. 2, the DC-DC converter 4 is a multiphase converter constituted of four phases, in which a U-phase converter DC1, a V-phase converter DC2, a W-phase converter DC3 and an X-phase converter DC4 are connected in parallel.

The constitution of the U-phase converter DC1 will be described. The U-phase converter DC1 comprises a reactor L1 and a switching circuit section IPM1. The switching circuit section IPM1 includes therein a switch SW1 and a diode D1, and is constituted of a module which is called a power card.

When a switching operation (the switching of ON/OFF) of the switch SW1 is periodically performed, the accumulation of electric energy in the reactor L1 and the release of the accumulated energy are periodically repeated. The released electric energy is output through the diode D1. Since the electric energy is once accumulated in the reactor L1 and then released, a voltage between output voltages P9 and P10 of the U-phase converter DC1 becomes a higher voltage than the output voltage of the fuel cell device 2 which is the input voltage.

The V-phase converter DC2, the W-phase converter DC3 and the X-phase converter DC4 have the same constitution as in the above U-phase converter DC1, and similarly operate. That is, when the switching operation of a switch (SW2, SW3, or SW4) is performed, the accumulation of electric energy in a reactor (L2, L3, or L4) and the release of the accumulated energy are periodically repeated, thereby outputting the higher voltage than the input voltage.

The switches SW1, SW2, SW3 and SW4 are basically controlled so as to perform the switching operation at a timing regulated so that each mutual phase difference becomes 90 degrees ($\pi/2$).

The U-phase converter DC1, the V-phase converter DC2, the W-phase converter DC3 and the X-phase converter DC4 comprise ammeters I1, I2, I3, and I4 to measure currents flowing through the reactors L1, L2, L3, and L4, respectively. The switches SW1, SW2, SW3 and SW4 are controlled to regulate the respective switching operations, while feeding back current values, so that the current values measured by these ammeters I1, I2, I3 and I4 become equal to one another.

The ammeters I1, I2, I3 and I4 are all provided on current paths on a side opposite to current paths connected to the switching circuit section IPM1 and switching circuit sections IPM2, IPM3, and IPM4 (i.e., a fuel cell device 2 side) in the current paths connected to the reactors L1, L2, L3, and L4. Therefore, even when an electric noise is generated by the switching operations of the switching circuit sections IPM1, IPM2, IPM3 and IPM4, the noise reaches the ammeters I1, I2, I3, and I4 through the reactors L1, L2, L3, and L4. Since the electric noise is lowered through the reactors L1, L2, L3, and L4, it is possible to more exactly measure the currents by the ammeters I1, I2, I3, and I4.

Output portions of the U-phase converter DC1, the V-phase converter DC2, the W-phase converter DC3 and X-phase converter DC4 are connected in parallel with one capacitor C1. The capacitor C1 levels and outputs the voltages output from the U-phase converter DC1, the V-phase converter DC2, the W-phase converter DC3, and the X-phase converter DC4. After the voltage is leveled by the capacitor C1, the power is output through power output portions PO1 and PO2 toward the inverter 5.

Relays R1 and R2 are interposed between the power output portions PO1 and PO2 and the inverter 5. The relays R1 and R2 switch the connection and shutoff of paths through which the power is output from the power output portions PO1 and PO2 to the inverter 5.

Figure 3:
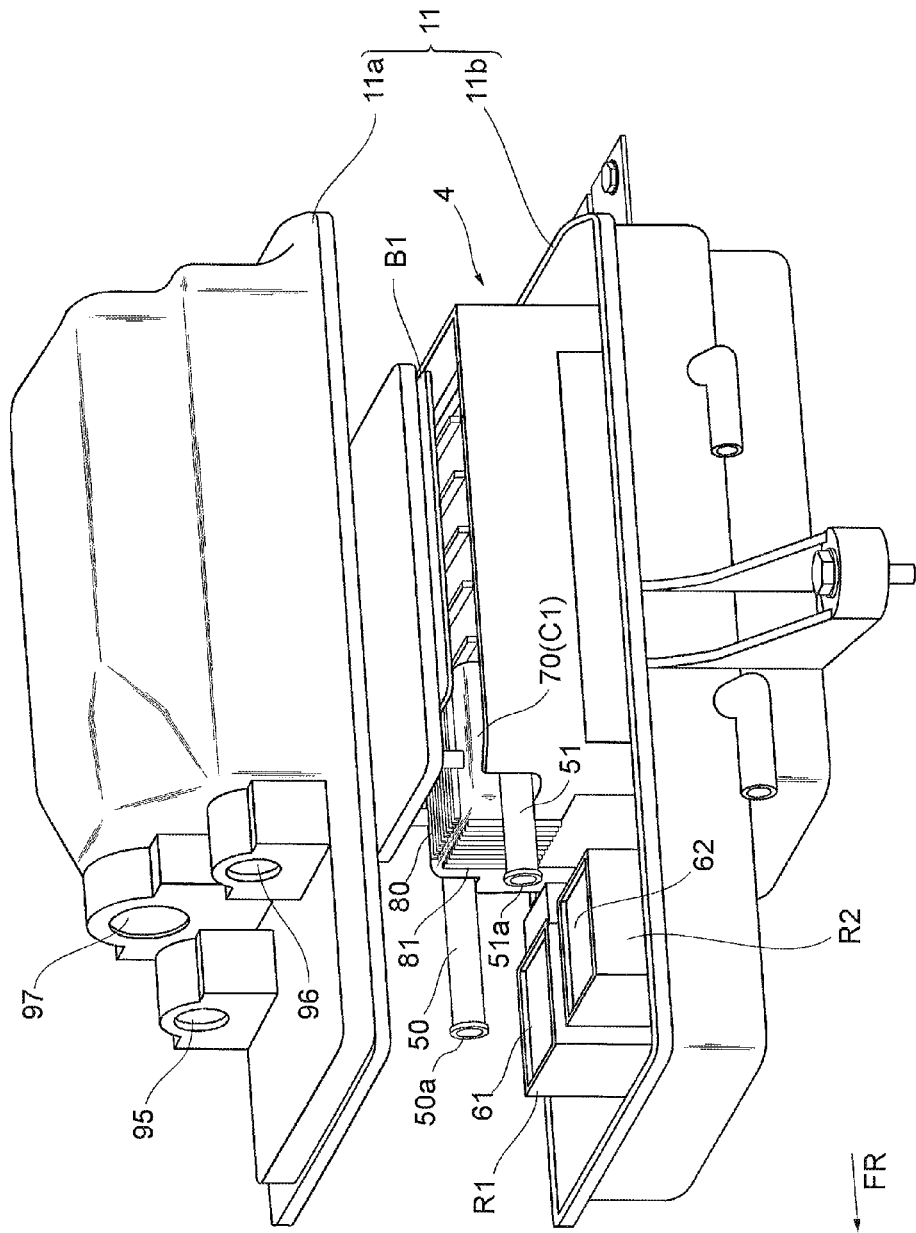
FIG. 3 is a perspective view showing a constitution of a boost converter mounted on the fuel cell vehicle shown in FIG. 1.
Figure 4:
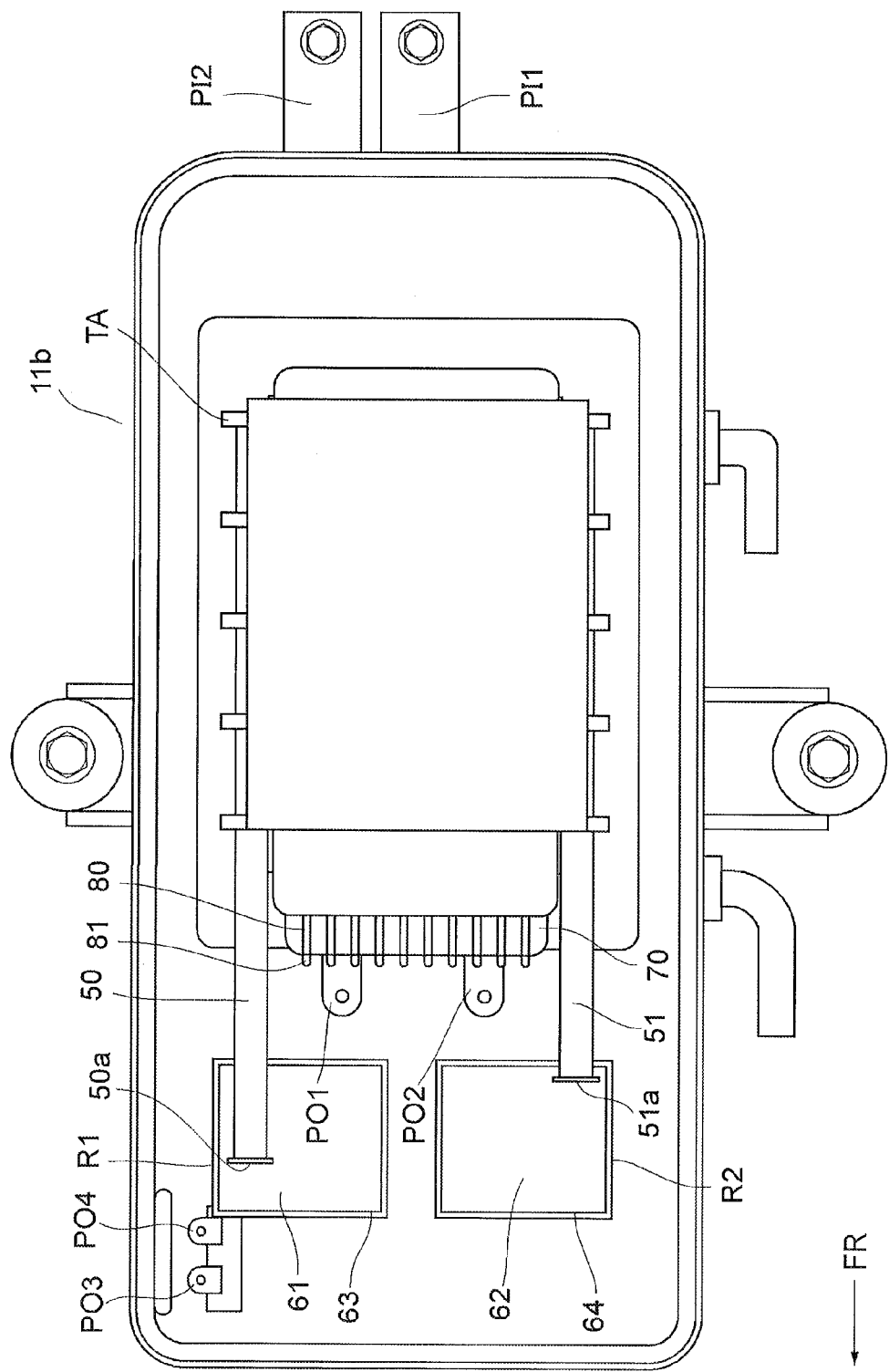
FIG. 4 is a top plan view showing the constitution of the boost converter mounted on the fuel cell vehicle shown in FIG. 1.
Figure 5:
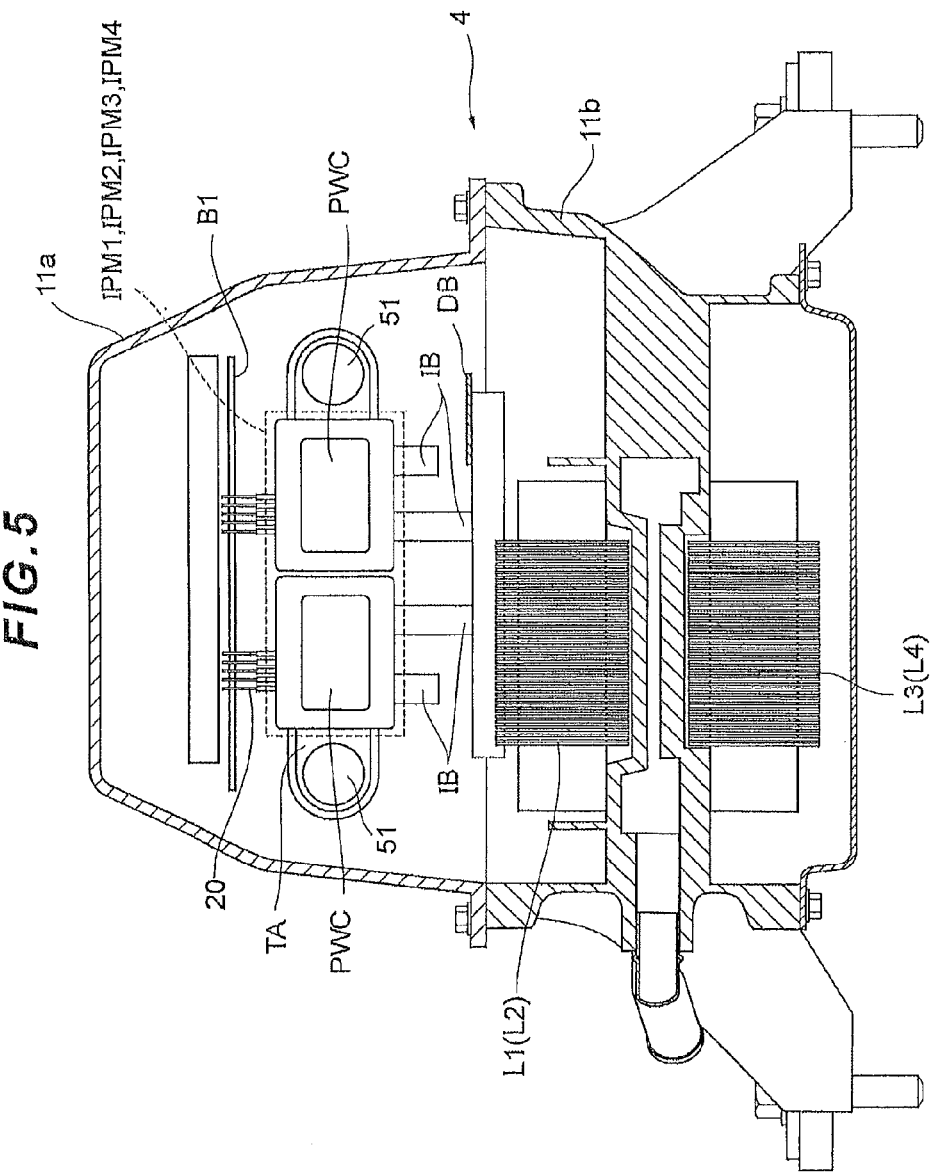
FIG. 5 is a sectional view showing the constitution of the boost converter mounted on the fuel cell vehicle shown in FIG. 1.

Subsequently, a specific constitution of the DC-DC converter 4 will be described with reference to FIGS. 3 through 5. FIG. 3 is a perspective view showing the constitution of the DC-DC converter 4, and showing that an upper lid 11a of the storage case 11 in which the DC-DC converter 4 is stored is removed. FIG. 4 is a top plan view showing the constitution of the DC-DC converter 4. FIG. 5 is a sectional view showing the constitution of the DC-DC converter 4, and showing a cross section of the DC-DC converter 4 cut along a plane perpendicular to a forward-backward direction of the vehicle.

The storage case 11 is a case formed by aluminum die casting, and constituted of the upper lid 11a and a lower container 11b. The storage case 11 is disposed in the center tunnel of the fuel cell vehicle 1, while the DC-DC converter 4 is stored in a space between the upper lid 11a and the lower container 11b. In the storage case 11, the relays R1 and R2 are also stored in addition to the reactors L1, L2, L3, and L4, the switching circuit sections IPM1, IPM2, IPM3, and IPM4 and the capacitor C1 constituting the DC-DC converter 4.

Since the storage case 11 is disposed in the center tunnel, the case has an elongated shape. As shown in FIG. 4, the side surface of the case at one end side in a longitudinal direction thereof is provided with power input portions PI1 and PI2 through which the power supplied by the fuel cell device 2 is input. As described above, the DC-DC converter 4 is disposed on the front side of the vehicle from the fuel cell device 2, and hence the DC-DC converter 4 is stored in the storage case 11, while the power input portions PI1 and PI2 are directed on a rear side of the vehicle.

The power output portions PO1 and PO2 and the relays R1 and R2 need to be electrically connected to the inverter disposed on the front side of the vehicle, and are therefore arranged close to the other end side of the storage case 11 (the front side of the vehicle). Output terminals PO3 and PO4 to output the power through the relays R1 and R2 toward the inverter 5 are present in the storage case 11, and are installed in the right direction of the vehicle, so that the terminals can be connected through openings present in the side surface of the storage case 11 (the right direction of the vehicle).

The arrangement of the reactors L1, L2, L3 and L4 and the switching circuit sections IPM1, IPM2, IPM3 and IPM4 constituting the DC-DC converter 4 will be described. As shown in FIG. 5, all the reactors L1, L2, L3 and L4 are divided into two upper and lower layers and arranged in the downside of the storage case 11. In each layer, two reactors are arranged side by side in a depth direction of a paper sheet of FIG. 5. The reactors L1, L2, L3 and L4 are arranged while the reactors are stored in not-shown reactor storage cases. Outside each reactor storage case, a refrigerant flow path to cool each reactor is disposed.

Each of the switching circuit sections IPM1, IPM2, IPM3 and IPM4 is constituted as a set of a plurality of power cards PWC. Each power card PWC is disposed at a position above the reactors L1, L2, L3, and L4 in an upward-downward direction of the vehicle.

A control board B1 which controls operations of the respective power cards PWC is disposed above the respective power cards PWC constituting the switching circuit sections IPM1, IPM2, IPM3, and IPM4. Upper portions of the respective power cards PWC are provided with a plurality of pins 20 each extending upwards, and by the pins 20, the control board B1 is connected to the respective power cards PWC. The control board B1 sends a control signal to each power card PWC through the pins 20, and controls the switching operations of the switching circuit sections IPM1, IPM2, IPM3, and IPM4.

Lower portions of the respective power cards PWC are provided with a plurality of IPM bus bars IB each extending downwards. The IPM bus bars IB are bus bars which electrically connect the reactors L1, L2, L3, and L4, the fuel cell device 2 and the capacitor C1 to the switching circuit sections IPM1, IPM2, IPM3, and IPM4.

Figure 6:
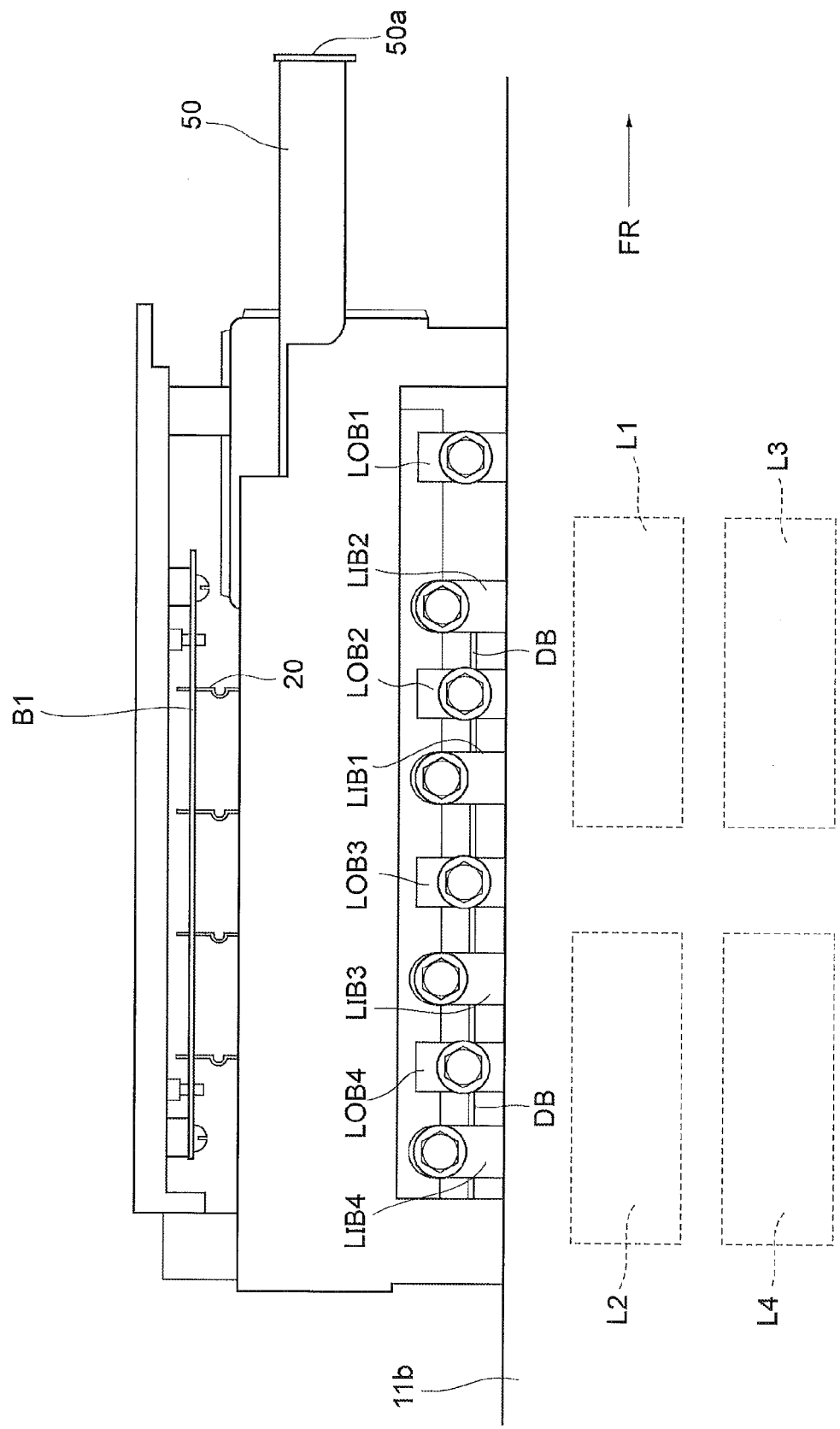
FIG. 6 is a side view showing the constitution of the boost converter mounted on the fuel cell vehicle shown in FIG. 1.

Subsequently, the electric connection of the reactors L1, L2, L3 and L4 to the power input portion PI1 and the electric connection of the reactors (L1, L2, L3 and L4) to the switching circuit sections IPM1, IPM2, IPM3 and IPM4 will be described with reference to FIG. 6 and FIG. 7. FIG. 6 is a side view showing the constitution of the DC-DC converter 4, and showing the side surface of the DC-DC converter 4 seen from the right side of the vehicle.

The reactors L1, L2, L3 and L4 are electrically connected to the power input portion PI1 by connecting, to a distribution bus bar DB connected to the power input portion PI1, first reactor bus bars LIB1, LIB2, LIB3, and LIB4 each extending from one end of each of the reactors L1, L2, L3, and L4.

The distribution bus bar DB is a horizontally disposed metal plate having one end connected to the power input portion PI1. As shown in FIG. 6 and FIG. 7, the distribution bus bar DB is disposed along the forward-backward direction of the vehicle, in the vicinity of the side surface of the DC-DC converter 4 on the right side of the vehicle. Moreover, the distribution bus bar DB is disposed at a height between the switching circuit sections IPM1, IPM2, IPM3, and IPM4 and the reactors L1, L2, L3, and L4, in the upward-downward direction of the vehicle. Additionally, the distribution bus bar DB corresponds to a region connecting the power input portion PI1 to P1, P2, P3, and P4, in the circuit shown in FIG. 2.

One end of each of the reactors L1, L2, L3 and L4 is connected to each of the first reactor bus bars LIB1, LIB2, LIB3, and LIB4, and the other end thereof is connected to each of second reactor bus bars LOB1, LOB2, LOB3, and LOB4. That is, each of the four reactors is connected to two reactor bus bars, and eight reactor bus bars are connected in total.

As shown in FIG. 6, ends of these eight reactor bus bars are arranged so as to protrude from the downside to the upside, at a position higher than the distribution bus bar DB. The eight reactor bus bars are arranged in a row along the forward-backward direction of the vehicle, between the distribution bus bar DB and the inner wall of the storage case 11. Furthermore, the second reactor bus bars and the first reactor bus bars are alternately arranged from the front side toward the rear side of the vehicle.

Figure 7:
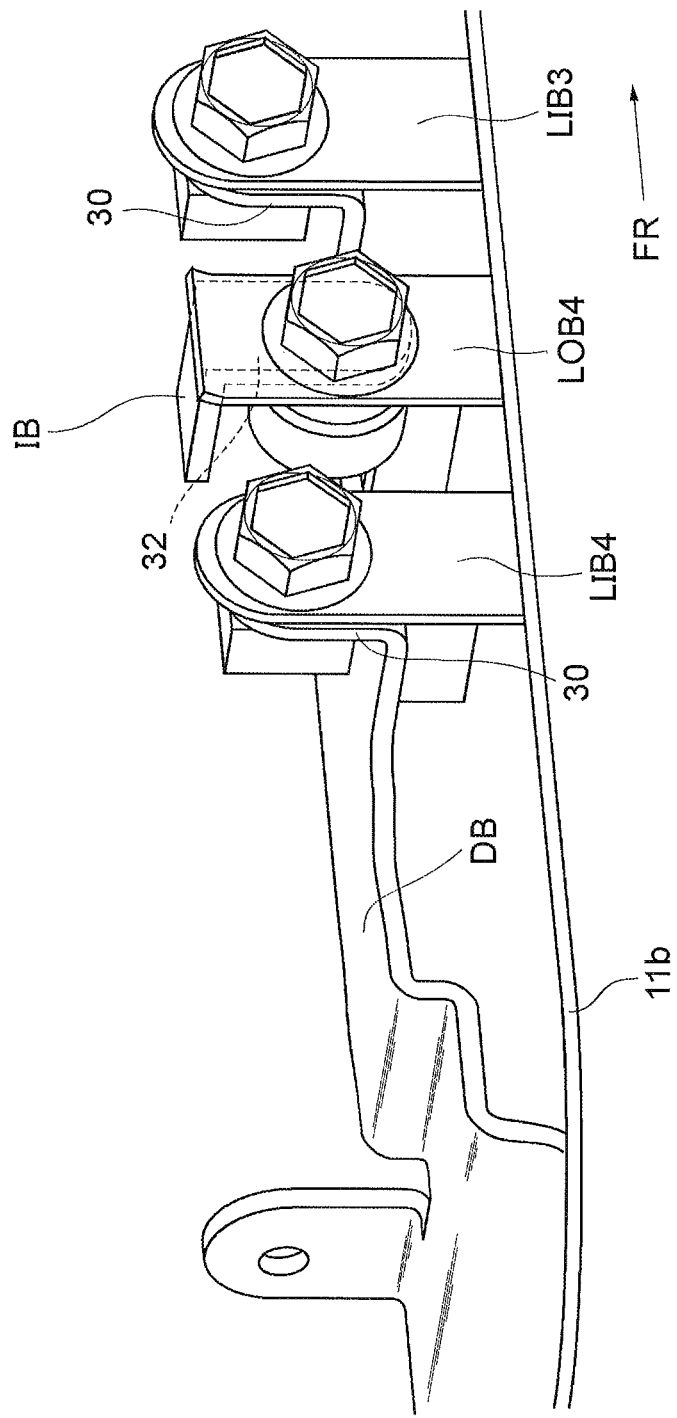
FIG. 7 is a perspective view showing a constitution of a connecting portion of a reactor bus bar in the boost converter mounted on the fuel cell vehicle shown in FIG. 1.

As shown in FIG. 7, the distribution bus bar DB is provided with bending portions 30 which bend upwards, respectively, at positions facing the first reactor bus bars LIB1, LIB2, LIB3, and LIB4. The bending portions 30 and the first reactor bus bars LIB1, LIB2, LIB3 and LIB4, which are overlapped with one another, are fastened with bolts, whereby the first reactor bus bars LIB1, LIB2, LIB3 and LIB4 are connected to the distribution bus bar DB. Moreover, fastening positions of the bending portions 30 of the distribution bus bar DB with the first reactor bus bars LIB1, LIB2, LIB3 and LIB4 are all at the same height.

The reactors L1, L2, L3 and L4 are electrically connected to the switching circuit sections IPM1, IPM2, IPM3, and IPM4 by connecting, to the IPM bus bars IB provided under the respective power cards PWC, the second reactor bus bars LOB1, LOB2, LOB3, and LOB4 each extending from one end of each of the reactors L1, L2, L3, and L4. These connecting portions correspond to P5, P6, P7, and P8 in FIG. 2. Additionally, the IPM bus bars IB are directly connected to the second reactor bus bars LOB1, LOB2, LOB3, and LOB4, but may be connected thereto via each separate relay bus bar between both the bars.

The respective IPM bus bars IB are formed to protrude from the DC-DC converter 4 toward the vehicle right side, at positions facing the second reactor bus bars LOB1, LOB2, LOB3, and LOB4. As shown in FIG. 7, the respective IPM bus bars IB are formed so as to have horizontal portions 31 which protrude horizontally from the switching circuit sections IPM1, IPM2, IPM3, and IPM4 toward the vehicle right side, and bending portions 32 which bend downwards from tips of the horizontal portions 31.

These bending portions 32 and the second reactor bus bars LOB1, LOB2, LOB3 and LOB4, which are overlapped with one another, are fastened with bolts, whereby the second reactor bus bars LOB1, LOB2, LOB3 and LOB4 are connected to the respective IPM bus bars IB. Moreover, fastening positions of the bending portions 32 of the IPM bus bars IB with the second reactor bus bars LOB1, LOB2, LOB3 and LOB4 are all at the same height.

As described above, in the fuel cell vehicle 1 according to the present embodiment, connecting portions of the power input portion PI1 (the distribution bus bar DB) to the reactors L1, L2, L3, and L4 and connecting portions of the reactors L1, L2, L3 and L4 to the switching circuit sections IPM1, IPM2, IPM3 and IPM4 are all arranged side by side along the forward-backward direction of the vehicle, and are arranged in this state on the side of one side surface of the DC-DC converter 4 on the right side of the vehicle.

According to such a constitution, while avoiding the vehicle front side on which a first piping 50 and a second piping 51 described later are present and the vehicle rear side on which the bus bars and the like for connecting the DC-DC converter 4 to the fuel cell device 2 are arranged, it is possible to arrange the connecting portions of the power input portion PI1 (the distribution bus bar DB) to the reactors L1, L2, L3 and L4, and the connecting portions of the reactors L1, L2, L3, and L4 to the switching circuit sections IPM1, IPM2, IPM3, and IPM4.

Moreover, these connecting portions are arranged side by side along the forward-backward direction of the vehicle. Therefore, even in the four-phase converter provided with the four reactors as in the present embodiment, a width of the DC-DC converter 4 in the right-left direction of the vehicle does not increase. Furthermore, all these connecting portions are arranged on the side of the one side surface of the DC-DC converter 4 on the right side of the vehicle. Therefore, unlike a case where the connecting portions are arranged on both side surfaces, the width of the DC-DC converter 4 in the right-left direction of the vehicle is decreased, so that it is possible to dispose the DC-DC converter 4 in the center tunnel.

Furthermore, as shown in FIG. 6 and FIG. 7, the fastening positions of the bending portions 30 of the distribution bus bar DB with the first reactor bus bars LIB1, LIB2, LIB3 and LIB4 are higher than the fastening positions of the bending portions 32 of the IPM bus bars IB with the second reactor bus bars LOB1, LOB2, LOB3, and LOB4.

According to such a constitution, the respective horizontal portions 31 of the IPM bus bars IB are arranged close to the distribution bus bar DB. In consequence, the switching circuit sections IPM1, IPM2, IPM3 and IPM4 arranged above the reactors L1, L2, L3 and L4 are arranged at lower positions. In consequence, the height of the DC-DC converter 4 is lowered, and it becomes easier to dispose the DC-DC converter 4 in the center tunnel.

Figure 8:
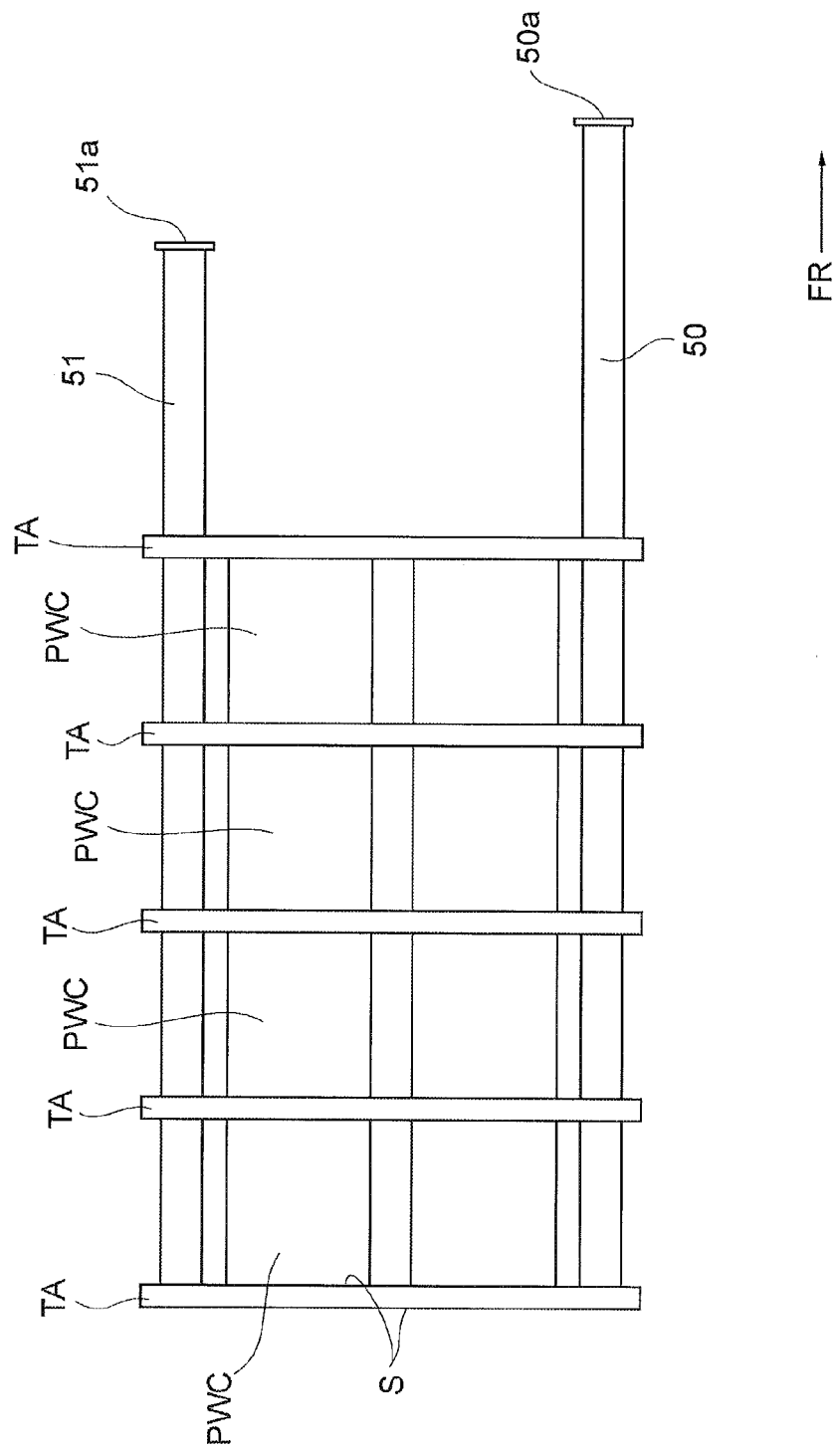
FIG. 8 is a view schematically showing a constitution of a refrigerant flow path to cool a switching circuit section in the boost converter mounted on the fuel cell vehicle shown in FIG. 1.
Figure 9:
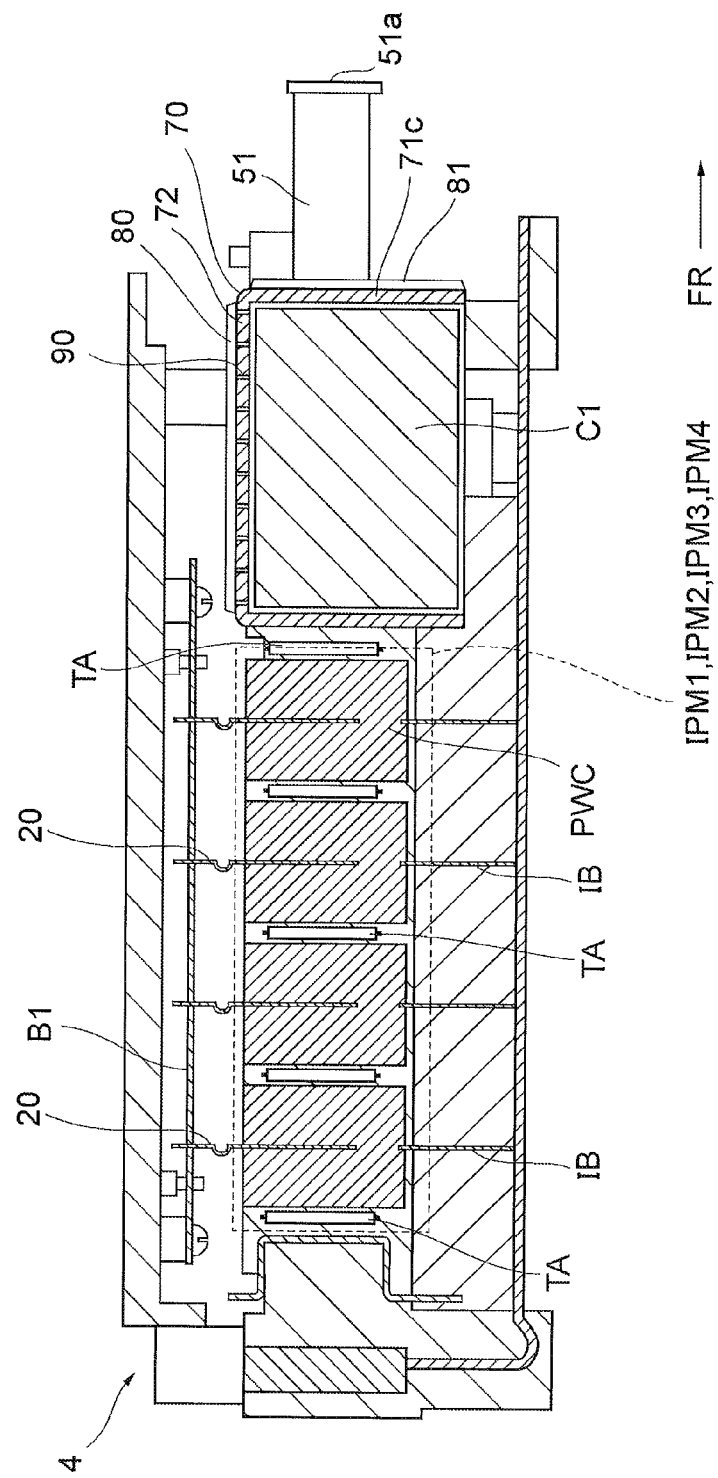
FIG. 9 is a sectional view showing the constitution of the boost converter mounted on the fuel cell vehicle shown in FIG. 1.

Next, a cooling mechanism of the switching circuit sections IPM1, IPM2, IPM3 and IPM4 will be described with reference to FIG. 8 and FIG. 9. FIG. 8 is a view schematically showing a constitution of a refrigerant flow path to cool the power cards PWC constituting the switching circuit sections IPM1, IPM2, IPM3, and IPM4. FIG. 9 is a sectional view showing the constitution of the DC-DC converter 4 in the vicinity of the switching circuit sections IPM1, IPM2, IPM3, and IPM4, and showing a cross section of the converter cut along a plane perpendicular to the right-left direction of the vehicle.

As shown in FIG. 8, the cooling mechanism of the switching circuit sections according to the present embodiment comprises thirteen tanks TA, the first piping 50, and the second piping 51. The thirteen tanks TA are hollow tanks each having two front and back flat surfaces S, and the respective flat surfaces S are arranged so as to face each other in parallel. Each of the tanks TA is disposed to sandwich two power cards PWC between the tank and the adjacent tank (between the flat surface S and the flat surface S).

The first piping 50 and the second piping 51 are hollow pipings each having a cross section formed in a round shape, and are horizontally arranged along the forward-backward direction of the vehicle so as to perpendicularly extend through the flat surfaces S of the tanks TA. Both the first piping 50 and the second piping 51 have the same height, and are arranged in parallel with each other.

The first piping 50 extends through the respective tanks TA at the right side end of the vehicle, and the second piping 51 extends through the respective tanks TA at the left side end of the vehicle. In consequence, all the power cards PWC sandwiched between the tanks TA are interposed between the first piping 50 and the second piping 51. All inner spaces of the first piping 50 and the second piping 51 communicate with inner spaces of the respective tanks TA.

A vehicle front side end 50a of the first piping 50 is a portion connected to a first radiator piping (not shown) extending from the radiator 7, to receive the refrigerant flowing thereinto from the radiator 7. Moreover, a vehicle front side end 51a of the second piping 51 is a portion which is connected to a second radiator piping (not shown) extending from the radiator 7, and through which the refrigerant flows out toward the radiator 7.

When the refrigerant supplied from the radiator 7 flows into the first piping 50 through the end 50a, such a refrigerant flows through the first piping 50 toward the vehicle rear side. Afterward, the refrigerant passes through the inner spaces of the respective tanks TA communicating with the first piping 50, and flows into the second piping 51. The refrigerant flowing into the second piping 51 flows toward the end 51a, and flows out toward the radiator 7.

The refrigerant takes heat from the respective power cards PWC sandwiched between the tanks TA to cool the cards, when passing through the inner spaces of the respective tanks TA. The heat taken from the respective power cards PWC is carried to the radiator 7 by the refrigerant, and released to the outside air through the radiator 7.

As described above, the end 50a of the first piping 50 is connected to the first radiator piping, and the end 51a of the second piping 51 is connected to the second radiator piping. However, it is necessary to remove these first radiator piping and second radiator piping, at the time of the repair or maintenance of the fuel cell vehicle 1. However, the first piping 50 and the second piping 51 are horizontally arranged as described above. Therefore, when the first radiator piping and the second radiator piping are removed, the refrigerant remaining in the first piping 50 and the second piping 51 flows out through the ends 50a and 51a, and drops down sometimes. As this countermeasure, the present embodiment comprises liquid receiving trays 61 and 62 which receive the refrigerant in preparation for a case where the refrigerant flows out and drops down through the ends 50a and 51a.

Again referring to FIG. 4, the relays R1 and R2 are arranged vertically under the end 50a of the first piping 50 and vertically under the end 51a of the second piping 51, respectively. The upper surface of the relay R1 and the upper surface of the relay R2 are provided with side walls 63 and 64 in outer peripheral portions of the surfaces. Therefore, even when the refrigerant drops down to the upper surfaces of the relays R1 and R2, the refrigerant does not flow over the side walls 63 and 64 to the outside. That is, the upper surface and the side wall 63 of the relay R1 constitute the liquid receiving tray 61, and the upper surface and the side wall 64 of the relay R2 constitute the liquid receiving tray 62.

The fuel cell vehicle 1 according to the present embodiment comprises the liquid receiving trays 61 and 62 as described above. In consequence, even when the refrigerant remaining in the first piping 50 and the second piping 51 flows out and drops down through the ends 50a and 51a, it is possible to securely prevent a disadvantage that the current path present under the ends is contaminated. It is possible to save a lot of work at the time of service. Moreover, the liquid receiving trays 61 and 62 are formed in the upper portions of the relays R1 and R2 which are conventional components. Therefore, while suppressing a volume increase of the DC-DC converter 4 caused by adding the liquid receiving trays, it is possible to prevent a disadvantage when the refrigerant flows out.

Next, the arrangement of the capacitor C1 will be described with reference to FIG. 9 and FIG. 10. As already described, the capacitor C1 levels the voltages output from the U-phase converter DC1, the V-phase converter DC2, the W-phase converter DC3, and the X-phase converter DC4 to output the voltages. Therefore, for decreasing a loss of the power, a distance between the capacitor C1 and each of the switching circuit sections IPM1, IPM2, IPM3, and IPM4 is preferably as short as possible. In the present embodiment, as shown in FIG. 9, the capacitor C1 is disposed at a position adjacent to the switching circuit sections IPM1, IPM2, IPM3, and IPM4. When the capacitor C1 is disposed at such a position, the loss of the power is decreased, and inductance is lowered. Consequently, it is possible to lower surge voltages of the switching circuit sections IPM1, IPM2, IPM3, and IPM4.

Figure 10:
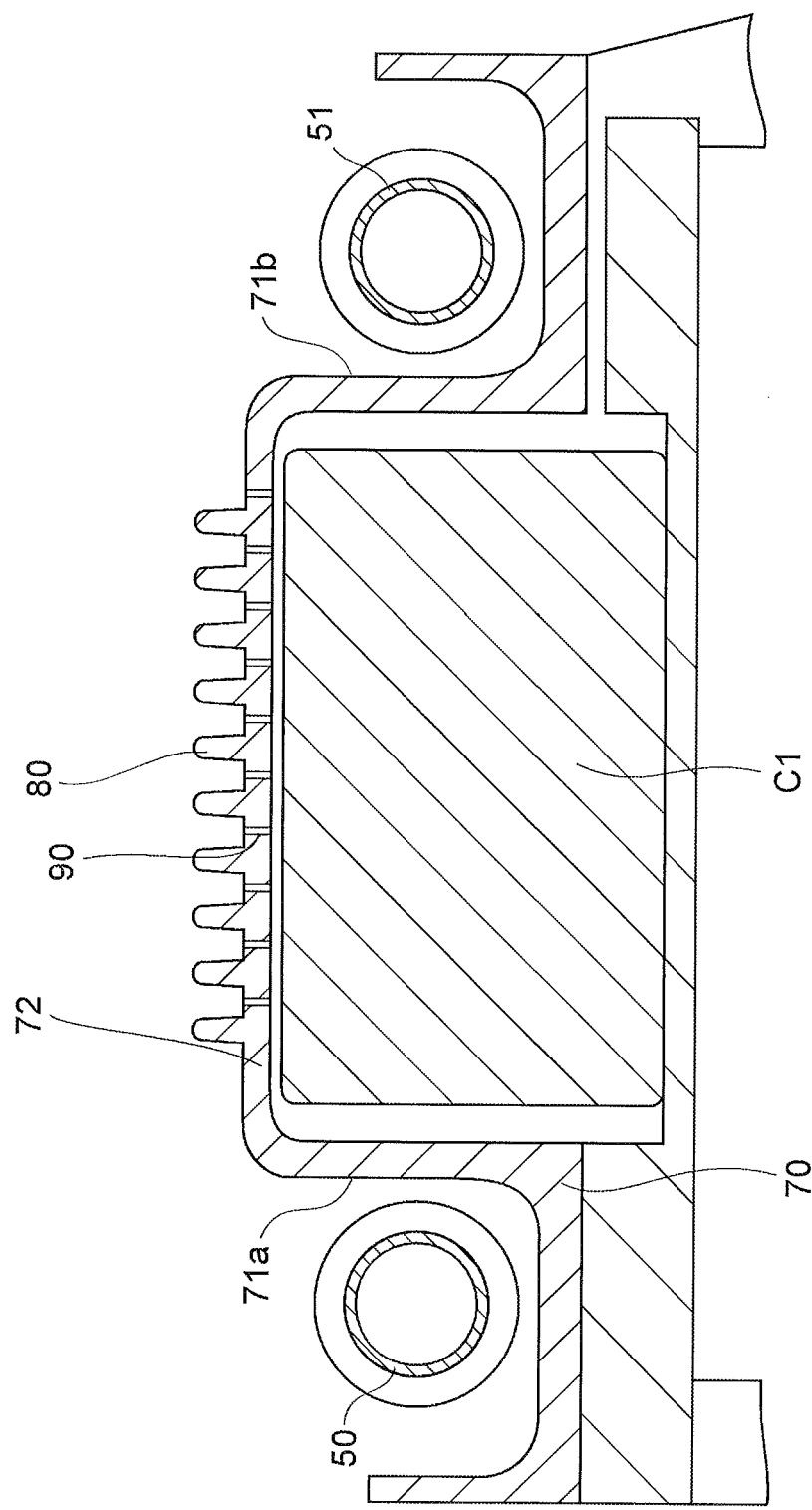
FIG. 10 is a sectional view showing the constitution of the boost converter mounted on the fuel cell vehicle shown in FIG. 1.

FIG. 10 is a sectional view showing a constitution of the DC-DC converter 4, and showing a cross section of the capacitor C1 cut along a plane perpendicular to the forward-backward direction of the vehicle. As shown in FIG. 10, the capacitor C1, which is stored in a capacitor cover 70 to protect this capacitor, is interposed between the first piping 50 and the second piping 51.

The capacitor cover 70 comprises a side wall portion 71 which covers the side surface of the capacitor C1, and an upper wall portion 72 which covers the upper surface of the capacitor C1, and a portion of the cover corresponding to the bottom surface of the capacitor C1 is open. Therefore, the capacitor C1 is inserted into the capacitor cover 70 from the downside thereof, and then fixed to the capacitor cover 70.

The capacitor C1 generates the heat during the operation of the DC-DC converter 4. However, when the DC-DC converter 4 is disposed in a small space such as the center tunnel, it is difficult to sufficiently acquire a path through which the heat generated in the converter is released. A temperature of the capacitor C1 excessively rises sometimes.

In the present embodiment, as described above, a cooling piping to cool the capacitor C1 is not separately provided, but the capacitor C1 is interposed between the first piping 50 and the second piping 51. Temperatures of the first piping 50 and the second piping 51 lower owing to the refrigerant circulating through the pipings. Therefore, an air temperature around the capacitor C1 lowers owing to these pipings, and the temperature of the capacitor C1 is prevented from excessively rising.

Additionally, as already described with reference to FIG. 8, the first piping 50 and the second piping 51 need to be disposed away from each other so as to sandwich the power card PWC therebetween. Furthermore, the first piping 50 and the second piping 51 require a predetermined length so that the switching circuit sections are not damaged by forces applied to the pipings, when the first radiator piping and the second radiator piping are connected to the first piping 50 and the second piping 51, respectively.

That is, the first piping 50 and the second piping 51 need to be disposed away from each other from the beginning, and require the predetermined length. Therefore, it can be considered that needless to say, a space is formed between the first piping 50 and the second piping 51. When the capacitor C1 is disposed according to the present embodiment, such an existing space is effectively utilized. Therefore, when the capacitor C1 is disposed, a volume occupied by the DC-DC converter 4 does not increase.

A specific constitution of the capacitor cover 70 will be described. As shown in FIG. 10, a vehicle right-side side wall portion 71a of the side wall portion 71 of the capacitor cover 70 is disposed close to the first piping 50. Furthermore, a vehicle left-side side wall portion 71b of the side wall portion 71 of the capacitor cover 70 is disposed close to the second piping 51.

According to such a constitution, the first piping 50 and the second piping 51 in which the temperatures lower owing to the refrigerant circulating through the pipings cool the capacitor cover 70 disposed close to these pipings. In consequence, it is possible to efficiently cool the capacitor C1 covered with the capacitor cover 70. Additionally, part of the side wall portion 71a protrudes toward the first piping 50, so that the capacitor cover 70 may be brought into contact with the first piping 50. According to such a constitution, the capacitor cover 70 can directly be cooled by the first piping 50.

In the upper wall portion 72 of the capacitor cover 70, a plurality of through holes 90 are formed. The through holes 90 function as vent holes through which air present around the capacitor C1 escape to a space above the upper wall portion 72. Therefore, it is possible to acquire the path through which the heat generated in the capacitor C1 escapes to the outside of the capacitor cover 70, and it is possible to more efficiently cool the capacitor C1.

In the upper wall portion 72 of the capacitor cover 70 and a side wall portion 71c thereof on the vehicle front side, radiating fins 80 and 81 are formed, respectively. When the radiating fins 80 and 81 are formed, heat radiation from the capacitor cover 70 to the ambient air can be promoted. It is possible to more efficiently cool the capacitor C1.

Subsequently, the arrangement of through holes formed in the storage case 11 will be described again with reference to FIG. 3. In the upper lid 11a of the storage case 11, a first through hole 95 is formed at a position corresponding to the first piping 50 in the side surface of the lid on the vehicle front side. The first through hole 95 is a hole formed so that the first radiator piping connected to the first piping 50 extends through the hole.

Moreover, in the upper lid 11a of the storage case 11, a second through hole 96 is formed at a position corresponding to the second piping 51 in the side surface of the lid on the vehicle front side. The second through hole 96 is a hole formed so that the second radiator piping connected to the second piping 51 extends through the hole.

Furthermore, the upper lid 11a of the storage case 11 is provided with a third through hole 97 through which an electric wiring is drawn from the DC-DC converter 4 to the outside. The third through hole 97 is formed at a position which is between the first through hole 95 and the second through hole 96 and is higher than the first through hole 95 and the second through hole 96, in the right-left direction of the vehicle. The third through hole 97 is provided with a not-shown grommet cap to protect the electric wiring.

According to such a constitution, a portion between the first through hole 95 and the second through hole 96 disposed away from each other in accordance with the width of each power card PWC is effectively utilized. The width of the storage case in the right-left direction of the vehicle is not enlarged, but the third through hole 97 through which the electric wiring is drawn to the outside can be formed. In consequence, the volume increase of the DC-DC converter 4 is suppressed, and it becomes easier to dispose the DC-DC converter 4 in the center tunnel.

The embodiment of the present invention has been described above with reference to the specific examples. However, the present invention is not limited to these specific examples. That is, the specific examples, to which a person skilled in the art has suitably added design change, are also included in the claims of the present invention, as long as the characteristics of the present invention are provided. For example, elements of the above specific examples and the arrangements, materials, conditions, shapes, sizes and the like of the elements are not limited to illustrations, and can suitably be changed. Moreover, the elements of the above embodiments can be combined as long as the combinations are technically enabled, and these combinations are also included in the claims of the present invention, as long as the characteristics of the present invention are included.

DESCRIPTION OF REFERENCE NUMERALS

1: fuel cell vehicle
2: fuel cell device
3: fuel tank
4: converter
5: inverter
6: motor
7: radiator
8: driver seat
9: front passenger seat
10: vent port
11: storage case
11a: upper lid
11b: lower container
20: pin
30: bending portion
31: horizontal portion
32: bending portion
50: first piping
50a: end
51: second piping
51a: end
61 and 62: tray
63 and 64: side wall
70: capacitor cover
71, 71a, 71b, and 71c: side wall portion
72: upper wall portion
80: radiating fin
90: through hole
95: first through hole
96: second through hole
97: third through hole
B1: control board
C1: capacitor
D1, D2, D3, and D4: diode
DB: distribution bus bar
DC1: U-phase converter
DC2: V-phase converter DC3: W-phase converter
DC4: X-phase converter
IB: IPM bus bar
IPM1, IPM2, IPM3, and IPM4: switching circuit section
L1, L2, L3, and L4: reactor
PI1 and PI2: power input portion
PO1, PO2, PO3, and PO4: power output portion
PWC: power card
TA: tank
R1 and R2: relay
S: flat surface
SW1, SW2, SW3, and SW4: switch

The invention claimed is:

1. A fuel cell vehicle having a floor panel provided with a center tunnel extending in a forward-backward direction of the vehicle, fuel cells which are direct-current power sources and a boost converter which raises output voltages of the fuel cells to output a power being disposed in the center tunnel along the forward-backward direction of the vehicle,
wherein the boost converter comprises:
a power input portion to input the power supplied by the fuel cells;
reactors each having one end connected to the power input portion;
switching circuit sections connected to the other end of each of the reactors; and
a power output portion connected to the switching circuit sections to output the power, and
connecting portions of the power input portion to the reactors and connecting portions of the reactors to the switching circuit sections are all arranged side by side along the forward-backward direction of the vehicle, and arranged in this state on the side of one side surface of the boost converter on one of the right side and the left side of the vehicle.

2. The fuel cell vehicle according to claim 1, wherein the reactor is provided below the switching circuit section in an upward-downward direction of the vehicle,
the reactor has a first reactor bus bar electrically connected to the power input portion, and a second reactor bus bar electrically connected to the switching circuit section,
an input bus bar extending from the power input portion is interposed between the switching circuit section and the reactor in the upward-downward direction of the vehicle,
a position of a connecting portion between the input bus bar and the first reactor bus bar is provided at a higher position than a position of a connecting portion between the switching circuit section and the second reactor bus bar.

3. The fuel cell vehicle according to claim 1, wherein current measuring means for measuring a current flowing through the reactor is provided on a current path on a side opposite to a current path connected to the switching circuit section in a current path connected to the reactor.

4. The fuel cell vehicle according to claim 1, further comprising:
a capacitor which is interposed between the switching circuit section and the power output portion, to level the output voltage of the boost converter;
a refrigerant flow path which is disposed adjacent to the switching circuit section, and through which a refrigerant to cool the switching circuit section circulates;
a first piping through which the refrigerant is supplied to the refrigerant flow path, and which is disposed so as to extend from the boost converter toward the front side of the vehicle; and
a second piping through which the refrigerant is discharged from the refrigerant flow path, and which is disposed away from the first piping so as to extend from the boost converter toward the front side of the vehicle,
wherein the capacitor is interposed between the first piping and the second piping, in the vicinity of the switching circuit section.

5. The fuel cell vehicle according to claim 4, wherein the capacitor is fixed to a capacitor cover disposed so as to cover at least a portion of an outer periphery of the capacitor, and
the capacitor cover comes in contact with at least one of the first piping and the second piping.

6. The fuel cell vehicle according to claim 5, wherein the capacitor cover has an upper wall portion which covers the upper surface of the capacitor, and in the upper wall portion, a vent hole extending through the upper wall portion is formed.

7. The fuel cell vehicle according to claim 5, wherein the capacitor cover is provided with a radiating fin.

8. The fuel cell vehicle according to claim 4, further comprising:
a radiator to cool the refrigerant on the vehicle front side from the boost converter;
a first radiator piping extending from the radiator and connected to the first piping; and
a second radiator piping extending from the radiator and connected to the second piping,
wherein vertically under a first connecting portion connecting the first piping to the first radiator piping and a second connecting portion connecting the second piping to the second radiator piping, liquid receiving trays are provided so as to receive the refrigerant, when the refrigerant flows out through the first connecting portion and the second connecting portion.

9. The fuel cell vehicle according to claim 8, wherein the power output portion is connected to relays to switch the supply and shutoff of the power for the load, and the liquid receiving trays are formed in upper portions of the relays.

10. The fuel cell vehicle according to claim 8, wherein the boost converter, which is stored in a storage case, is disposed in the center tunnel,
in the storage case,
a first through hole through which the first piping or the first radiator piping extends, and
a second through hole through which the second piping or the second radiator piping extends are formed, and
a third through hole through which an electric wiring connected to the boost converter is drawn to the outside is further formed at a position between the first through hole and the second through hole, in the right-left direction of the vehicle.

* * * * *